US007634117B2

(12) United States Patent
Cho

(10) Patent No.: US 7,634,117 B2
(45) Date of Patent: Dec. 15, 2009

(54) APPARATUS AND METHOD OF FINGERPRINT RECOGNITION FOR A MOBILE TERMINAL

(75) Inventor: Young-Hoon Cho, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 11/367,590

(22) Filed: Mar. 6, 2006

(65) Prior Publication Data

US 2006/0210126 A1 Sep. 21, 2006

(30) Foreign Application Priority Data

Mar. 7, 2005 (KR) ..................... 10-2005-0018823

(51) Int. Cl.
*G06K 9/00* (2006.01)

(52) U.S. Cl. ...................... 382/124; 382/125; 382/193; 382/195; 382/209

(58) Field of Classification Search ................ 382/124, 382/125, 195, 209
See application file for complete search history.

(56) References Cited

U.S. PATENT DOCUMENTS 5,040,223 A * 8/1991 Kamiya et al. ............. 382/127
5,796,857 A * 8/1998 Hara .......................... 382/124
6,526,396 B1 * 2/2003 Hiratsuka et al. ............. 706/52
2002/0150283 A1 * 10/2002 Mimura et al. ............. 382/124
2003/0123715 A1 * 7/2003 Uchida ....................... 382/124

FOREIGN PATENT DOCUMENTS

KR 10-2004-0037449 A 5/2004
KR 10-0550739 B1 5/2004
KR 10-0442579 B1 7/2004

* cited by examiner

*Primary Examiner*—Anand Bhatnagar
*Assistant Examiner*—Mike Rahmjoo
(74) *Attorney, Agent, or Firm*—Birch, Stewart, Kolasch & Birch, LLP

(57) ABSTRACT

An apparatus for recognizing a fingerprint includes a fingerprint sensing unit for scanning a fingerprint of a user; a storage using for storing a comparison model of the fingerprint of the user and various threshold values; a control unit for obtaining similarity between the fingerprint of the user scanned by fingerprint sensing unit and the comparison model stored in the storage unit, comparing it with a certain threshold value, and controlling a mobile terminal according to the comparison result; and a display unit for transferring a result (success or failure) of the fingerprint recognition or a request from the control unit to the user.

10 Claims, 3 Drawing Sheets

APPARATUS AND METHOD OF FINGERPRINT RECOGNITION FOR A MOBILE TERMINAL

BACKGROUND OF THE INVENTION

1. Field of the Invention

The present invention relates to a fingerprint recognition technique and, more particularly, to an apparatus and method for fingerprint recognition with continued updating of a reference user fingerprint.

2. Description of the Related Art

As mobile terminals are becoming more popular, sending and receiving sensitive or confidential information using mobile terminals is increasing. An example would be performing various financial transactions via a mobile phone (i.e., "mobile banking"). Such features related to user privacy and transmitting sensitive information require more advanced user authentication techniques. As such, mobile terminal manufacturers are providing security functions for mobile terminals by using biometrics authentication.

Typical biometrics authentication techniques include fingerprint recognition and iris recognition. Currently, fingerprint recognition is commonly implemented in mobile terminals.

Fingerprint recognition is a technique whereby the user places or swipes his finger on a fingerprint recognition apparatus (i.e., fingerprint sensor or reader). In general, two types of methods may be employed: the first is a total internal reflection method in which an image of the fingerprint is reflected by applying as intense light thereto for conversion into an electrical signal, and the second is a silicon chip sensing method in which a particular pattern of a fingerprint is read as an electrical signal by using electrical conduction characteristics of the user's finger that is placed or swiped.

In order to implement fingerprint authentication in a mobile terminal, a reference (or standard or 'comparison model') fingerprint of the user should be registered in the fingerprint recognition apparatus. To do so, the fingerprint recognizing apparatus may request the user to repeatedly scan his finger (or fingers) several times over a fingerprint sensor or other type of detecting means. Based upon these scans, a reference fingerprint can be created (by combining portions of multiple fingerprint scans) and stored, or the "best" (i.e., most accurately) scanned fingerprint among the multiple scans can be selected and stored.

Once the comparison model of the user fingerprint is determined and stored, the fingerprint recognizing apparatus performs a fingerprint recognition procedure by comparing a currently scanned fingerprint with the comparison model to thus determine whether the user has authorization.

FIG. 1 is a flow chart illustrating an exemplary process of a fingerprint recognition procedure for a mobile terminal in accordance with a related art.

When the mobile terminal is in an operation locked state, the fingerprint recognizing apparatus requests the user to place or swipe his finger(s) on an input device of the mobile terminal when the user attempts to use the mobile terminal. Then, the fingerprint(s) of the user is scanned through a fingerprint sensor (step S10).

The scanned fingerprint is compared with the registered comparison model (i.e., the reference fingerprint of an authorized user) (step S20), and when the scanned fingerprint is deemed sufficiently identical to the reference fingerprint, the lock function of the mobile terminal is released (step S60).

However, if the scanned fingerprint is deemed not sufficiently identical to the reference fingerprint, the mobile terminal informs the user that authorization has failed and may repeatedly perform the steps S10 and S20.

When more than a certain number of fingerprint recognition failures occur (e.g., three times) (step S40), the mobile terminal releases the fingerprint security function and requests the user to input a password. And then, the mobile terminal compares an inputted password with a previously stored password to determine whether to release the lock function previously set in the mobile terminal (step S50).

In the related art fingerprint recognizing apparatus of the mobile terminal, a sufficient number of fingerprint scans must be ideally performed in order to obtain enough fingerprint data to allow subsequent fingerprint recognition to be performed accurately. However, in most related art fingerprint authorization systems, in order to minimize user inconvenience, the comparison model of the user fingerprint is generated through a simplified procedure (such as obtaining only a minimum number of fingerprint scans), which leads to degraded reliability of fingerprint authentication. In addition, since the finger placement or swiping performed by the user when actually attempting to access the mobile terminal may be inconsistent (e.g., different speeds at which the user swipes his finger, different amounts of pressure applied when pressing down his finger, etc.), the success rate of accurate fingerprint recognition is undesirably too low.

In addition, when fingerprint recognition is deemed unsuccessfully after more than a certain number of failed attempts, the related art mobile terminal releases the security function provided by the fingerprint recognition feature, and instead, user authentication is performed through password inputting. As such, the related art fingerprint recognizing apparatus does not substantially use the security function based upon fingerprint recognition. Thus, the related art fingerprint recognition technique for a mobile terminal can be easily by-passed or avoided by unauthorized users who may access the mobile terminal by using password information obtained in an unauthorized manner from the rightful user.

BRIEF DESCRIPTION OF THE INVENTION

An important aspect of the invention is the recognition by the present inventors regarding the above-explained problems of the related art.

In order to solve these problems, an object of the present invention is to provide a system and method for improved fingerprint recognition by comparing the quality of a currently scanned fingerprint with the reference fingerprint (that is used as a comparison model), and updating the reference fingerprint with the currently scanned fingerprint as necessary, without having to perform a complicated re-registration process whereby the user is asked to repeatedly scan his finger to obtain a reference fingerprint.

To achieve at least the above objects in whole or in parts, there is provided an apparatus for recognizing a fingerprint of a mobile terminal comprising: a fingerprint sensing unit for scanning a fingerprint of a user; a storage unit for storing a comparison model of the fingerprints of the user; and a controller for comparing the similarity between the scanned fingerprint and the comparison model with a certain threshold value, and releasing a lock function set in a mobile terminal or releasing the lock function and updating the comparison model according to the comparison result.

Preferably, if the similarity is equal to or greater than a first threshold value but smaller than a second threshold value, the controller releases the lock function set in the mobile terminal.

Preferably, the first threshold value is a reference value set for user authentication.

Preferably, the second threshold value is a reference value set for updating the comparison model.

Preferably, if the similarity is equal to or greater than the second threshold value, the controller releases the lock function set in the mobile terminal and registers the scanned fingerprint as a new comparison model.

Preferably, if the similarity is smaller than the first threshold value, the controller re-scans the fingerprint of the user to obtain similarity of the user fingerprint, and compares the obtained similarity with the certain threshold value again.

Preferably, if the decision that the similarity is smaller than the first threshold value is detected by a certain number of times or more, the controller lowers a security level of the fingerprint recognition.

To achieve at least these advantages in whole or in parts, there is further provided a method for recognizing a fingerprint of a mobile terminal comprising: scanning a fingerprint of a user; obtaining similarity between the scanned fingerprint and a comparison model; and comparing the similarity with a certain threshold value, or releasing a lock function set in a mobile terminal according to the comparison result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE INVENTION

The present invention is directed to upgrading information regarding a reference fingerprint of a user without performing a process of re-registering the fingerprint by considering the most recently scanned fingerprint of the user that may be used to update the comparison model whenever a fingerprint recognition procedure is performed. Namely, a scanned fingerprint is compared with the comparison model (reference fingerprint) and if a degree of similarity as a result of the comparison exceeds a certain reference value, the scanned fingerprint becomes a new comparison model to be used for fingerprint recognition.

Although the following features will be described with reference to a mobile terminal (mobile phone, handset, PDA, etc.), various other types of devices that may require implementation of fingerprint authentication may benefit from the teachings and suggestions of the present invention.

The preferred embodiment of the present invention will now be described with reference to the accompanying drawings.

Figure 1:
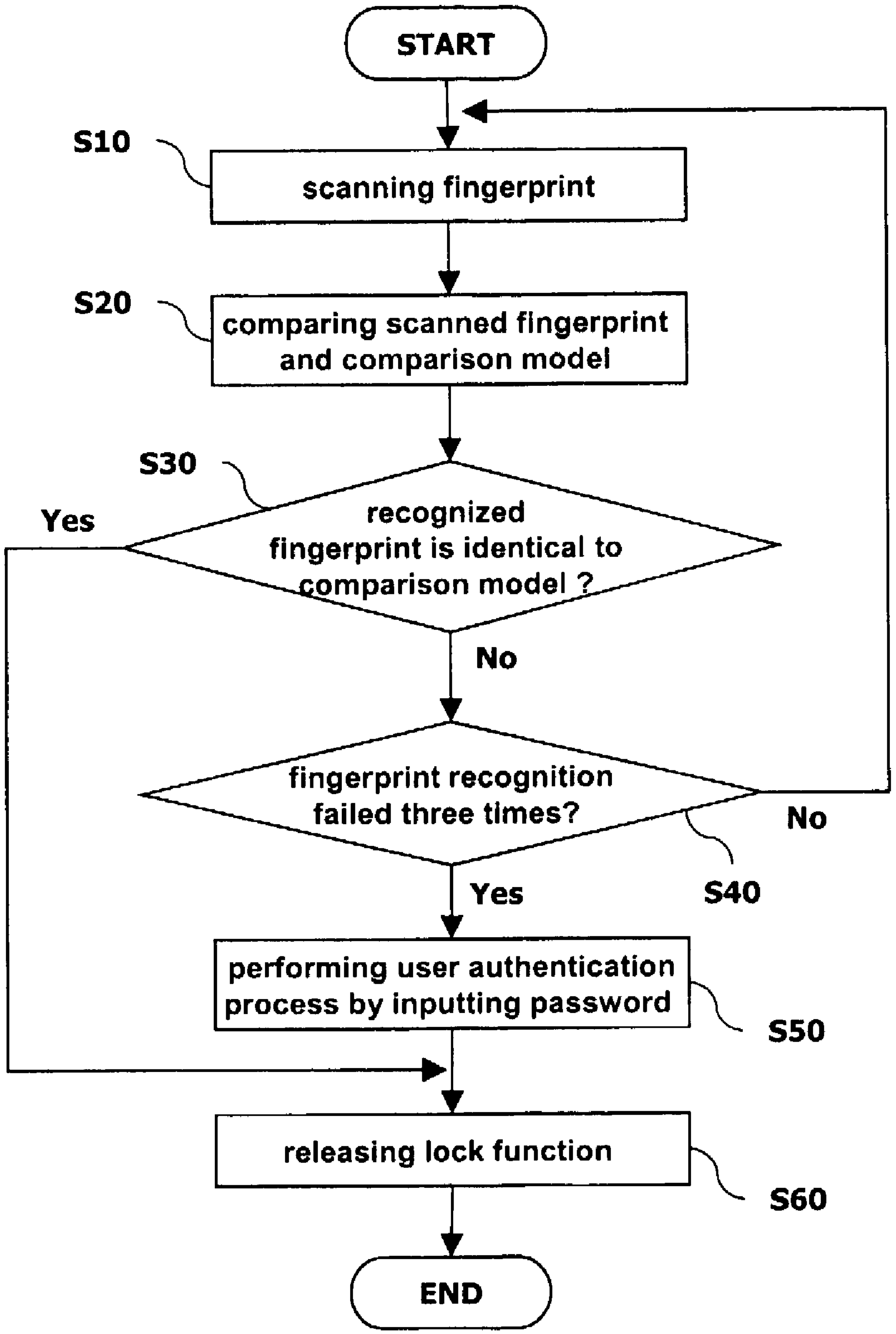
FIG. 1 Related Art
FIG. 1 is a flow chart illustrating a fingerprint recognition procedure in accordance with a related art.
Figure 2:
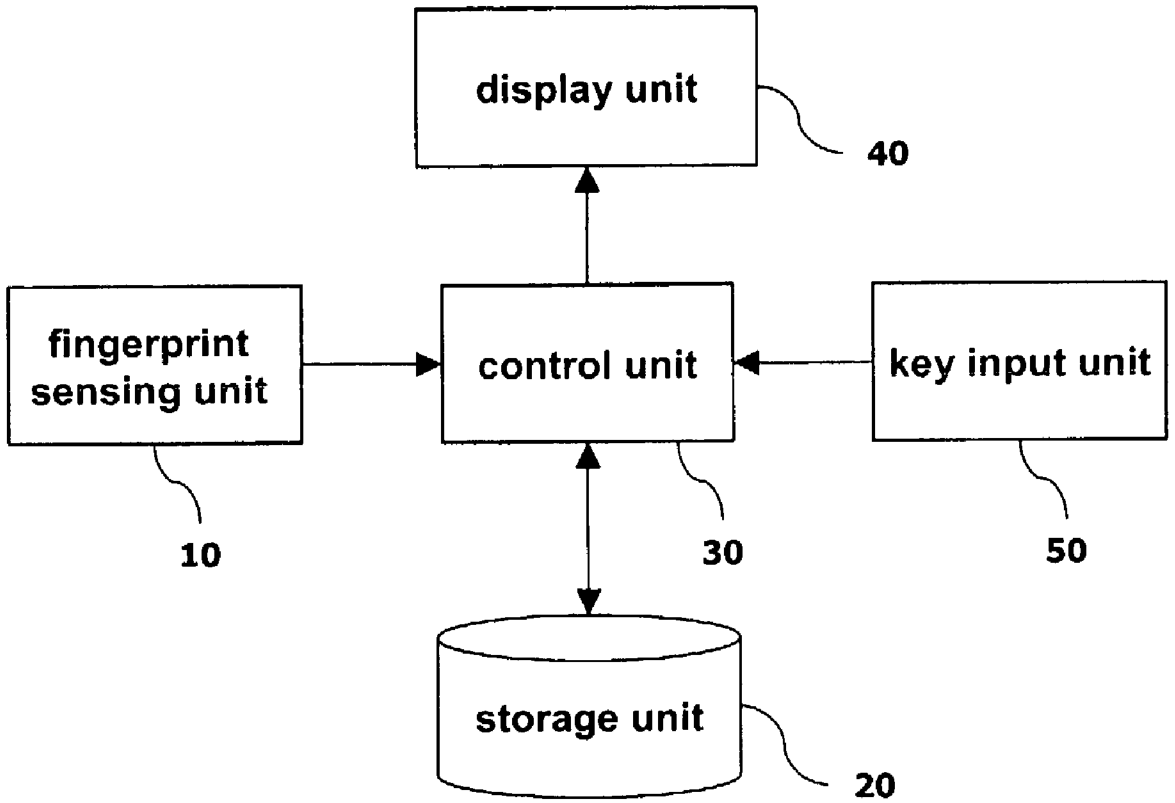
FIG. 2 is a schematic block diagram showing an exemplary apparatus for recognizing a fingerprint in accordance with the present invention.

FIG. 2 is a schematic block diagram showing an exemplary apparatus for recognizing a fingerprint in accordance with the present invention.

As shown in FIG. 2, the apparatus for recognizing a fingerprint may include a fingerprint sensing unit 10 for scanning a fingerprint of a user; a storage unit 20 for storing a comparison model of the fingerprint of the user and various threshold values; a control unit 30 for detecting a similarity between the fingerprint of the user scanned by fingerprint sensing unit 10 and the comparison model stored in the storage unit 20, comparing it with a certain threshold value, and controlling a mobile terminal according to the comparison result; and a display unit 40 for providing a result (success or failure) of the fingerprint recognition or a request from the control unit 30 to the user.

Figure 3:
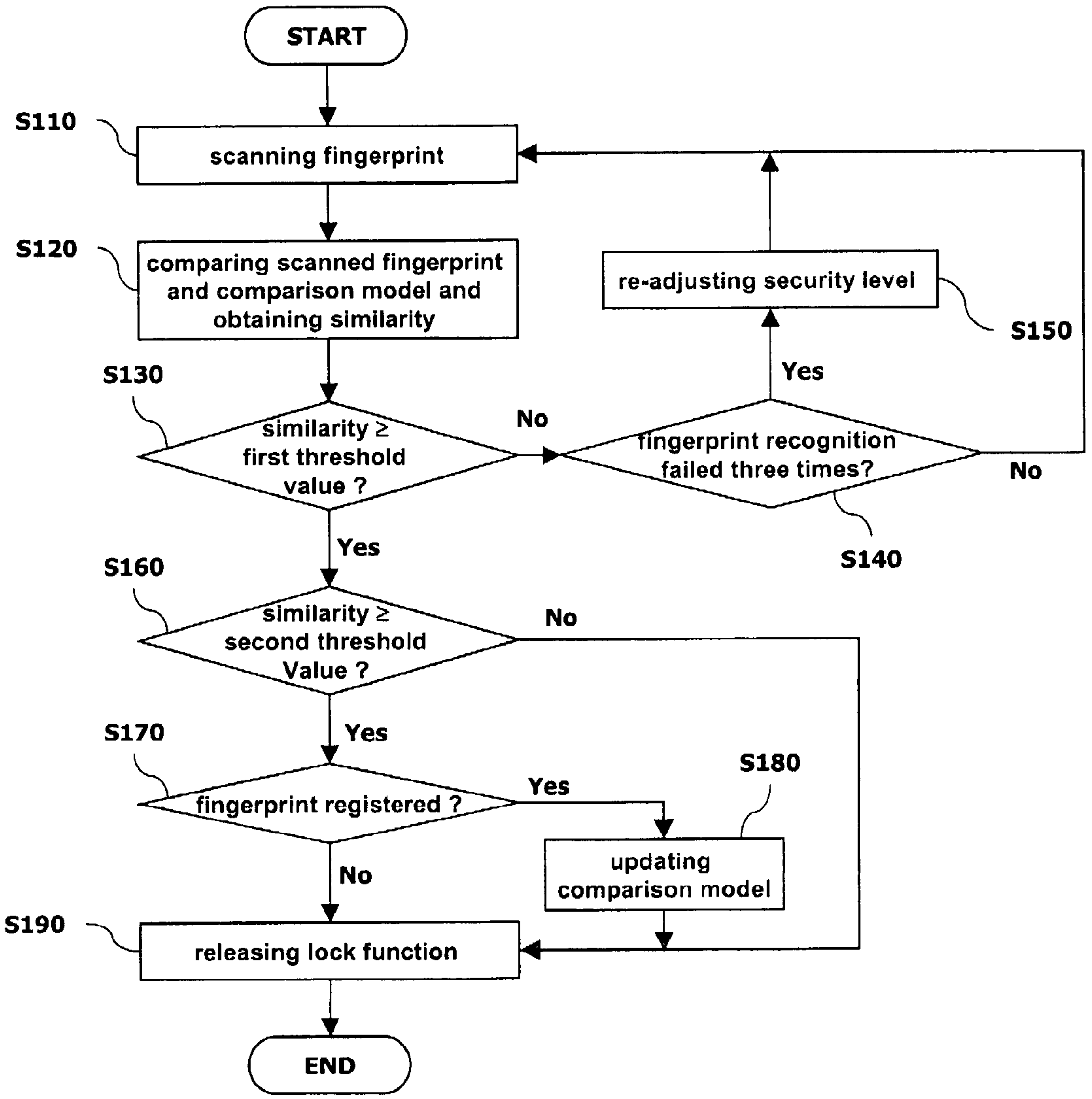
FIG. 3 is a flow chart illustrating an exemplary fingerprint recognition procedure in accordance with the present invention.

FIG. 3 is a flow chart illustrating an exemplary fingerprint recognition procedure in accordance with the present invention.

Referring to FIGS. 2 and 3, the method for authenticating the user of the mobile terminal through fingerprint recognition and upgrading the reference fingerprint (comparison model) will now be described in more detail.

To begin with, in the present invention, a reference (standard) fingerprint scan is secured and then registered as a comparison model in the mobile terminal in a manner similar to that in the related art method. However, unlike the related art method, a single "initial" scan may be set as the reference fingerprint used for subsequent user authentication. Even if the initial fingerprint scan quality is not so good, the present invention may update the reference fingerprint such that a better quality fingerprint scan may later replace the initial reference fingerprint.

Based upon certain security options of the mobile terminal (such as, when a lock function had been set, whenever a particular function is activated, upon turning on power, etc.), fingerprint authentication may need to be performed.

For example, if a lock function of the mobile terminal is set, and someone attempts to operate the mobile terminal, the control unit 30 requests that person to place or swipe his finger onto the display unit 40 (or other appropriate fingerprint input device) and scans the fingerprint by using a fingerprint sensing unit 10 (or other appropriate sensor) (step S10).

When the scanning operation of the fingerprint sensing unit is completed, the control unit 30 compares the scanned fingerprint with the comparison model (i.e., reference fingerprint) stored in the storage unit 20 to determine a similarity therebetween (step S120). Here, the similarity may be a probability value indicating a degree of similarity between the scanned fingerprint and the reference fingerprint.

In the present invention, two threshold values (first and second threshold values) may be set with respect to the similarity. The first threshold value may be a reference value set for user authentication, and the second threshold value may be a reference value set for updating the comparison model. The first and second threshold values may be experimental values previously determined by trial and error measurements. The second threshold value may be greater than the first threshold value.

When the similarity obtained by comparing the scanned fingerprint and the comparison model is not smaller than the first threshold value (T) but smaller than the second threshold value (T+β) (namely, the first threshold value 1≦similarity<the second threshold value), the control unit 30 determines that the scanned fingerprint is considered to be "identical" to the fingerprint of an authorized user and releases the lock function set in the mobile terminal so that the user can use the mobile terminal functions (step S190).

If the similarity is not smaller than the second threshold value (T+β), the control unit 30 determines that the scanned fingerprint is not only identical to the fingerprint of an authorized user, but also has a high enough quality to allow replacing (updating) of the stored reference fingerprint (comparison model). In this case, the lock function set in the mobile terminal is released (step S190) and the "high-quality" scanned fingerprint is registered in the storage unit 20 as the newly updated comparison model (step S180). When the scanned fingerprint is registered as the new comparison model, the control unit 30 can verify whether the user wishes to update the reference fingerprint. For example, a message such as 'want scanned fingerprint to be registered as new comparison model?' may be displayed on the display unit 40 for the user to see. If the user agrees to update (e.g., selects 'yes'), the newly scanned fingerprint is stored as the comparison model in the storage unit 20. However, the user may reject the updating procedure (e.g., selects 'no'), and the newly scanned fingerprint would not be stored.

Meanwhile, if the similarity is found to be even smaller than the first threshold value (T), the control unit 30 determines that the scanned fingerprint is not identical to the fingerprint of an authorized user, informs the user about the failed fingerprint recognition through the display unit 40 (or some other output means), and repeatedly performs the steps S110 to S130).

When the failure of the fingerprint recognition is repeated by a certain number of times or more (e.g., three times), the controller unit 30 may lower the security level of the fingerprint recognition procedure in order to increase a success rate of the authentication (step S150). Namely, if a current security level is set as high (e.g., the scanned fingerprint must match the reference fingerprint within three attempts), and if the fingerprint recognition fails a certain number of times (e.g., three times), the control unit 30 can then lowers the security level to a middle level (e.g., three additional attempts allowed).

Although the fingerprint authentication scheme of the present invention may be set such that a particular user may be locked out from using the mobile terminal if the fingerprint authentication is not successful after three tries (or some other particular number limit), the present invention may perform security level adjustments such that additional fingerprint authentication attempts are allowed. Doing so allows the fingerprint authentication to still be employed, instead of merely locking out the user or performing less sophisticated security measures (such as, requesting the user to merely input a password).

The table below shows exemplary reference values of each security level on the assumption that the security levels related to fingerprint recognition are divided into three levels: high, medium, and low. More or less security levels may be employed.

TABLE

| Security level | Reference value (first threshold value) |
|---|---|
| High | T + α |
| Medium | T |
| Low | T − α |

In the above table, 'T' and 'α' may be values determined by experimentation, and the total number of security levels can be varied.

In the process of adjusting the security level (step S150), when the security level is lowered from high to medium, the value of the first threshold value (i.e., the reference value of successful authentication) may be re-set according to the set security level. Namely, when the security level is lowered from high to medium, the first threshold value may be adjusted from 'T+α' to 'T'.

Thus, in the present invention, by re-setting the security level, even when the fingerprint recognition attempts fail several times (e.g., three times) or more, the security state according to the fingerprint recognition is preferably not released (to thus request a password input) as done in the related art. Namely, by lowering the fingerprint authentication security levels, the user authentication function based on the fingerprint recognition can still be employed.

As so far described, the apparatus for fingerprint authentication of a mobile terminal in accordance with the present invention has the following advantages.

For example, whenever the fingerprint recognition procedure is performed, the scanned fingerprint of the user may be newly registered as the comparison model (if certain conditions are met), without performing a complete re-registration procedure for that newly scanned fingerprint. As such, updating of the reference fingerprint can be performed as necessary, which results in more accurate fingerprint authentication to be performed.

In addition, when the failure of fingerprint recognition is repeated by a certain number of times or more, the security level may be re-adjusted by decreasing the first threshold value needed for user authentication, rather than changing the authentication procedure to a password input procedure. Thus, a more secure fingerprint authentication procedure can be implemented.

To implement the various features described above, the present invention can employ various types of hardware and/or software components (modules). For example, different hardware modules may contain various circuits and components necessary to perform the steps of the above method. Also, different software modules (executed by processors and/or other hardware) may contain various codes and protocols necessary to perform the steps of the present invention method.

The present invention provides a mobile terminal apparatus comprising: a fingerprint sensor to recognize a fingerprint inputted from a user; a memory to store a reference fingerprint of the user; and a processor cooperating with the fingerprint sensor and the memory to perform the steps of, determining whether the inputted fingerprint matches the stored reference fingerprint, authorizing the user if the determining results in a match, and updating the memory to replace the stored reference fingerprint with the inputted fingerprint, if the inputted fingerprint has a quality that exceeds a threshold value.

The processor, the fingerprint sensor, and the memory cooperate to perform the determining step a plurality of times according to security conditions that were previously set.

If the determining failed to result in a match and the authorizing is not performed, the processor adjusts the security conditions to be more lenient to allow the determining step to be additionally performed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An apparatus for recognizing a fingerprint for a mobile terminal, the apparatus comprising:

a fingerprint sensing unit which scans a fingerprint of a user;

a storage unit which stores a comparison model of fingerprints of the user; and a controller which compares a similarity between the scanned fingerprint and the comparison model with a first threshold value and a second threshold value which is greater than the first threshold value, releases a lock function set in the mobile terminal if the similarity is equal to or greater than the first threshold value, and registers the scanned fingerprint as a new comparison model if the similarity is equal to or greater than the second threshold value.

2. The apparatus of claim 1, wherein if the similarity is smaller than the first threshold value, the controller re-scans the fingerprint of the user to obtain another similarity of the user fingerprint, and compares the obtained similarity with the first threshold value and the second threshold value again.

3. The apparatus of claim 1, wherein if a decision that the similarity is smaller than the first threshold value is detected by a certain number of times or more, the controller lowers a security level of the fingerprint recognition.

4. A method for recognizing a fingerprint for a mobile terminal, the method comprising:

scanning a fingerprint of a user;

obtaining a similarity between the scanned fingerprint and a comparison model; and comparing the similarity with a first threshold value and a second threshold value which is greater than the first threshold value, releasing a lock function set in the mobile terminal if the similarity is equal to or greater than the first threshold value, and registering the scanned fingerprint as a new comparison model if the similarity is equal to or greater than the second threshold value.

5. The method of claim 4, wherein if the similarity is smaller than the first threshold value, the fingerprint of the user is re-scanned.

6. The method of claim 4, wherein if a decision that the similarity is smaller than the first threshold value is detected by a certain number of times or more, a security level of the fingerprint recognition is lowered.

7. An apparatus for recognizing a fingerprint for a mobile terminal, the apparatus comprising:

a fingerprint sensing unit which scans a fingerprint of a user;

a storage unit which stores a comparison model of fingerprints of the user; and a controller which compares a similarity between the scanned fingerprint and the comparison model with a first threshold value and a second threshold value which is greater than the first threshold value, releases a lock function set in the mobile terminal if the similarity is equal to or greater than the first threshold value but smaller than the second threshold value, and registers the scanned fingerprint as a new comparison model if the similarity is equal to or greater than the second threshold value.

8. The apparatus of claim 7, wherein if a decision that the similarity is smaller than the first threshold value is detected by a certain number of times or more, the controller lowers a security level of the fingerprint recognition.

9. A method for recognizing a fingerprint for a mobile terminal, the method comprising:

scanning a fingerprint of a user;

obtaining a similarity between the scanned fingerprint and a comparison model; and comparing the similarity with a first threshold value and a second threshold value which is greater than the first threshold value, releasing a lock function set in the mobile terminal if the similarity is equal to or greater than the first threshold value but smaller than the second threshold value, and registering the scanned fingerprint as a new comparison model if the similarity is equal to or greater than the second threshold value.

10. The method of claim 9, wherein if a decision that the similarity is smaller than the first threshold value is detected by a certain number of times or more, a security level of the fingerprint recognition is lowered.

* * * * *